US005261232A

United States Patent [19]

Maffini et al.

[11] Patent Number: 5,261,232

[45] Date of Patent: Nov. 16, 1993

[54] VALVE SYSTEM FOR SUPPLYING FLUID FROM A PAIR OF FLUID PRESSURE SOURCES TO A LOAD

[75] Inventors: Jacques Maffini, Lohr/Main; Rainer Näpfel, Neuhütten, both of Fed. Rep. of Germany

[73] Assignee: Mannesmann Rexroth GmbH, Lohn/Main, Fed. Rep. of Germany

[21] Appl. No.: 938,417

[22] Filed: Aug. 31, 1992

[30] Foreign Application Priority Data

Sep. 5, 1991 [DE] Fed. Rep. of Germany ....... 4129508

[51] Int. Cl.[5] .............................................. F16D 31/02

[52] U.S. Cl. .......................................... 60/429; 60/430; 60/452; 60/468

[58] Field of Search ................. 60/428, 429, 430, 431, 60/452, 459, 486, 468

[56] References Cited

U.S. PATENT DOCUMENTS

| | | | |
|---|---|---|---|
| 3,037,354 | 6/1962 | Tennis | 60/430 |
| 3,968,811 | 7/1976 | Fillion | 60/430 X |
| 4,017,215 | 4/1977 | Butler | 60/428 X |
| 4,141,280 | 2/1979 | Lorimor | 60/428 X |
| 4,383,412 | 5/1983 | Presley | 60/430 |
| 5,088,283 | 2/1992 | Bosniac | 60/468 |

FOREIGN PATENT DOCUMENTS

| | | | |
|---|---|---|---|
| 3422205 | 12/1985 | Fed. Rep. of Germany . | |
| 3222106 | 3/1991 | Fed. Rep. of Germany . | |
| 0047003 | 4/1980 | Japan | 60/428 |
| 0073203 | 5/1982 | Japan | 60/430 |

OTHER PUBLICATIONS 56-147902 A., M-113, Feb. 20, 1982, vol. 6, No. 29.
54-90456 M-74, Sep. 27, 1979, vol. 3, No. 116.
2-35203 A., M-963, Apr. 19, 1990, vol. 14, No. 193.

*Primary Examiner*—Edward K. Look
*Assistant Examiner*—Hoang Nguyen
*Attorney, Agent, or Firm*—Harness, Dickey & Pierce

[57] ABSTRACT

The invention relates to a valve system for supplying fluid from a pair of fluid pressure sources to a load. A feed valve is provided which feeds—when required—a partial flow of the second fluid pressure source into the feed line of the load which is connected to the first fluid pressure source through a directional control valve. The feed valve comprises a pressure-compensating valve to control the volume of the partial flow and a switching valve to automatically open the pressure-compensating valve when required.

15 Claims, 1 Drawing Sheet

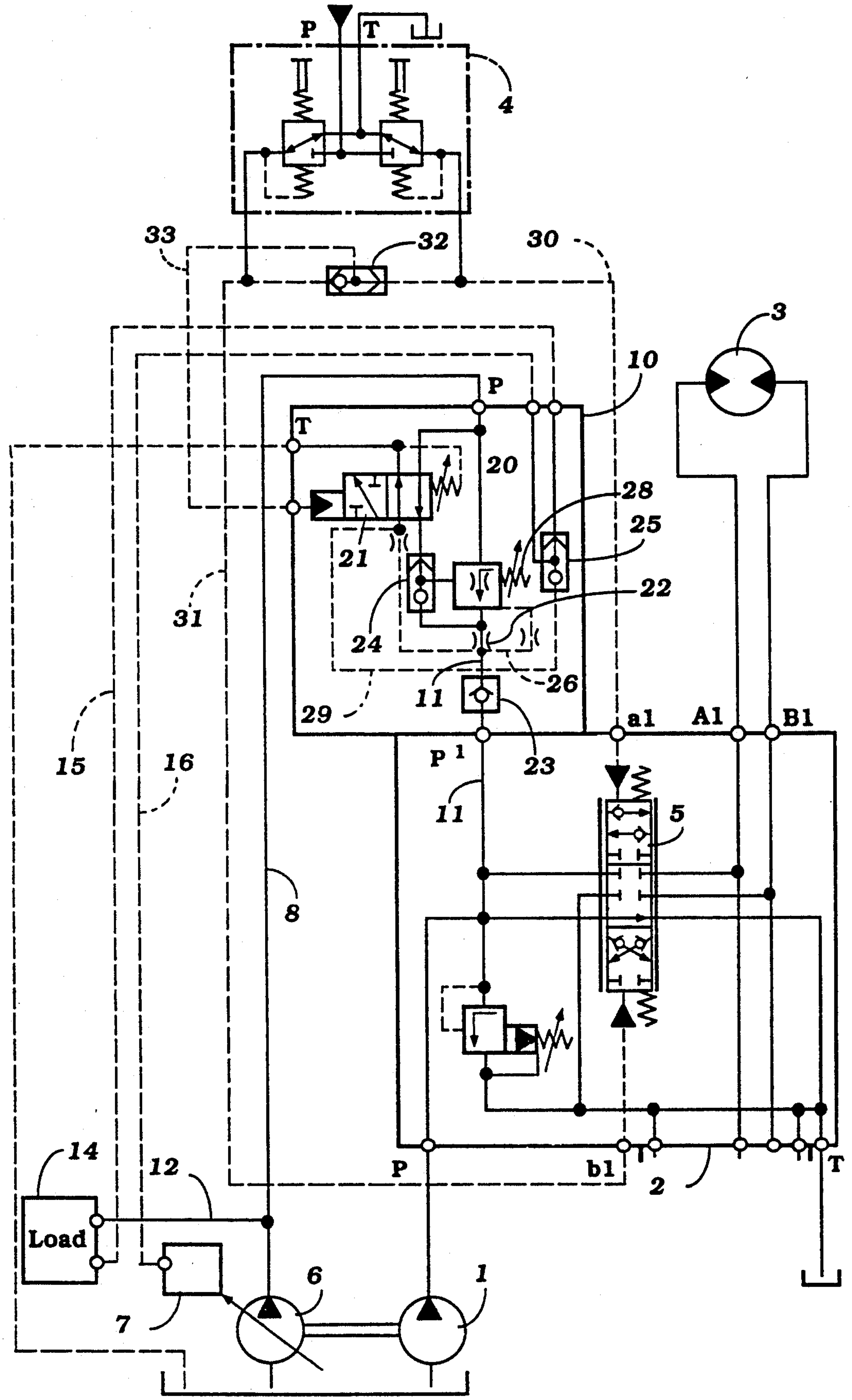
P
T
4
33
32
30
3
10
P
T
20
28
25
21
22
24
31
29
26
11
a1
A1
B1
23
P 1
15
16
11
5
8
14
12
P
b1
2
T
Load
7
6
1

VALVE SYSTEM FOR SUPPLYING FLUID FROM A PAIR OF FLUID PRESSURE SOURCES TO A LOAD

The present invention relates to a valve system for supplying fluid to a load from a pair of fluid pressure sources according to the preamble of claim 1. The invention particularly aims at a valve system for controlling a digger or excavator comprising a pump of constant volume having a relatively low power to supply pressurized fluid to the slewing gear motor, whereas a pump of adjustable volume supplies fluid to the other appliances of the digger. The adjusting pump may be of the load-sensing type such that the delivery volume is controlled in response to the highest load pressure which occurs in one of the loads. When after starting the slewing gear motor, the speed thereof has to further increased and in case the volume delivered by the constant volume pump is not sufficient, a relatively small part of the delivery volume of the pump of variable volume shall be supplied to the slewing gear motor.

Even if the operating conditions explained above refer to a specific application, the necessity occurs quite often to feed additional fluid from a second pressure source to one or a plurality of consumers.

It is therefore the object of the present invention to provide a feed system of such type in a simple manner and to automatically initiate the additional fluid supply. It is a further object of the invention to control the feed volume.

According to the invention the problem referred to is solved by features of claim 1. Further features and advantages of the invention are defined in the subclaims.

According to the invention the feed valve comprising a flow control valve and a switch valve may be automatically opened when the directional control valve controlling the load which requires additional fluid volume is actuated. The feed valve ensures a safer operation and may be easily combined in a valve block which may be directly flanged to the directional control valve of the load. Of course, other embodiments for the feed valve are possible when the feed valve is connected to the directional control valve through piping.

Other advantages and features of the invention will appear from the following description of a non-limiting embodiment with reference to the single figure which schematically shows a valve system according to the invention.

A fixed displacement pump 1 delivers pressurized fluid through a directional valve block 2 to a hydraulic motor 3, for example the drive motor for the rotating gear of a digger. The directional valve block 2 comprises a port P to be connected to the pump, a port T to be connected to a reservoir and ports A1, B1 to be connected to the motor lines. Still further the block 2 has ports a1 and b1 to be connected to a pilot valve block 4 in which a pilot pressure is set to actuate the directional control valve 5 to control the fluid path between the fixed displacement pump 1, the reservoir T and the motor 3 in both directions of rotation.

A variable displacement pump 6 including an adjustment means 7 to set the delivery volume of the pump 6 is connected through a feed line 8 to the port P of a feed valve 10. The port P, at the outlet of the feed valve 10 is connected to the pressure line 11 supplying fluid to the directional control valve 5. Accordingly both the partial volumes of both pumps 1 and 6 are combined upstream of the directional control valve 5 when the feed valve 10 is open.

A number of further loads 14 is connected to the pump pressure line 8 of the variable displacement pump 6 through 85 a branch line 12. A load-sensing system—-not explained in detail—is provided, i.e. the load pressures occurring in those individual loads are sensed and the highest load pressure is selected by means of a shuttle valve chain. The highest load pressure is then applied through a control pressure line 15 or respectively 16 to the adjusting means 7 of the pump 6 to set the delivery volume thereof in response to the highest load pressure occurring. A load-sensing system of this type is conventional and is thus not further explained in detail.

The feed line 10 comprises a two-way flow control valve 20 and a switch valve 21, an orifice 22 and a check valve 23 disposed in the feed line 11 as well as a pair of shuttle valves 24 and 25.

In the neutral position of the switch valve 21 shown, the pump pressure in the line 8 of the variable displacement pump 6 acts through the shuttle valve 24 on the control piston of the pressure-compensating valve 20 to maintain the control piston in the closed position. In this position the spring-sided control chamber of the valve 20 is connected through a line 26 in the switch valve 21 to the port T and thus to the reservoir. The control piston of the compensating valve 20 is thus pressure-relieved towards opening.

When the switch valve 21 is actuated into its other position, the reservoir pressure acts through the switch valve 21 and the shuttle valve 24 on the control side of the compensating valve 20 such that the compensating valve 20 opens by means of the force of the spring 28. The pressure difference occurring at the orifice 22 acts on the compensating valve 20 such that the pressure downstream of the orifice 22 biases the control piston towards opening and the pressure downstream of the orifice 22 biases through the shuttle valve 24 the control piston towards closing. Accordingly the feed volume is determined by the orifice when the compensating valve 20 is opened.

The highest load pressure occurring in the load-sensing system 14 is applied through the control line 15 to the shuttle valve 25 in the feed valve 10, whereas the pressure occurring downstream of the orifice 22, i.e. the load pressure of the motor 3, is applied alike to the shuttle valve 25. The higher pressure each is selected by the shuttle valve and biases through the control line 16 the adjusting means 7 of the variable displacement pump 6.

The switch valve 21 is actuated by the pressure which is set in one of the pilot pressure lines 30 and 31. This pressure is applied through a shuttle valve 32 and the line 33 to the switch valve 21. Accordingly, when the pilot pressure to actuate the directional control valve 5 reaches a predetermined value, the switch valve 21 is switched over from its neutral position into the position to feed additional fluid.

The operation is as follows:

As long as the pilot pressure set by the pilot pressure selector 4 is below a predetermined value, the switch valve 21 is maintained in the neutral position shown, in which the pressure P in the line 8 of the pump 6 is applied through the switch valve 21 and the shuttle valve 24 to the flow control valve 20 to keep the valve closed. The check valve 23 blocks fluid delivered from the pump 1 to be supplied to the feed valve 10. Accordingly the motor 3 is actuated by the directional control valve 5, using the volume delivered by the fixed displacement pump 1.

When the pilot pressure adjusted by the manually operated pilot valves 4 is set to a higher value, for example above 18 bar, to speed up the motor 3, the switch valve 21 is automatically switched over to the feed position. Then the control piston of the flow control valve 20 is pressure-relieved towards the reservoir T and the valve 20 opens to become operative inasfar as the fluid volume delivered by the variable displacement pump 6 has a higher pressure than the pressure of the fixed displacement pump 1. The volume to be fed will be determined by the orifice 22 as explained above. The volume flowing through the orifice 22 is maintained constant due to the operation of the pressure-compensating valve 20 which is a flow-control valve. The load pressure downstream of the orifice 22 is applied through the line 29 to the shuttle valve 25 and acts as load pressure indication in the load-sensing system. The motor 3 receives the delivery volume of the fixed displacement pump 1 and via the feed valve 10 a portion of the delivery volume of the variable displacement pump and is thus operated with higher speed.

We claim:

1. A valve system for supplying fluid from a first fluid pressure source to a load and a second pressure source to the load when required, comprising a directional control valve controlling the fluid path between said first fluid pressure source, a reservoir and said load and a feed valve provided between said directional control valve and said second fluid pressure source, characterized in that said feed valve comprises a flow control valve and a switch valve for controlling the control piston of the flow control valve said control piston being biased towards closing by the pressure of said second pressure source and spring-biased toward opening by a spring, said switch valve being moveable between a feed position in which said control piston is pressure-relieved towards closing and that the switch valve is actuated in response to supplying the load with pressurized fluid from said first pressure source and a pressure control position wherein pressure is supplied at a controlled value to said load from said second fluid pressure sources through a feed line, and an orifice is provided in said feed line, the control piston of said flow control valve being biased toward closing by the pressure upstream of said orifice and towards opening by the pressure downstream of said orifice.

2. The valve system of claim 1, wherein a check valve is provided in the feed line between the flow control valve and the directional control valve.

3. The valve system of claim 2, wherein the flow control valve, the orifice and the check valve are provided in the feed line in this sequence.

4. The valve system of claim 1, wherein the control chamber of the flow control valve to which the pressure is applied acting to close the valve is connected through a shuttle valve to the line between the flow control valve and the orifice and through the switch valve to the line leading to the first pressure source.

5. The valve system of one of claim 1, wherein the switch valve is actuated in response to actuating the directional control valve.

6. The valve system of claim 5, wherein the switch valve is actuated in response to a pilot pressure to control the directional control valve.

7. The valve system of claim 6, wherein the switch valve is actuated when a predetermined pilot pressure value is reached.

8. The valve system of claim 1, wherein the first fluid pressure source is a constant volume pump.

9. The valve system of one of claim 1, wherein the second fluid pressure source is a pump of variable volume.

10. The valve system of claim 9, wherein a plurality of loads is connected to the adjustable pump.

11. The valve system of claim 10, wherein the adjusting means of the variable volume pump is subjected to the highest pressure each of one of said loads.

12. The valve system of claim 11, wherein the adjusting means is connected through a shuttle valve to a line in which the highest load pressure of the further loads prevails or, respectively to the feed line.

13. The valve system of claim 1 in combination with a digger, wherein rotating drive means of the digger comprises the load and wherein the second fluid pressure source applies fluid to the digger.

14. The valve system of claim 1, wherein the flow control valve, the switch valve, and the orifice, are combined in a feed valve block.

15. The valve system of claim 14, wherein the feed valve block is fixed to the directional control valve block.

* * * * *

UNITED STATES PATENT AND TRADEMARK OFFICE

CERTIFICATE OF CORRECTION

PATENT NO. : 5,261,232

DATED : November 16, 1993

INVENTOR(S) : Maffini, et al

It is certified that error appears in the above-indentified patent and that said Letters Patent is hereby corrected as shown below:

Column 1, line 65, "P" should be --P'--.

Column 2, line 5, delete "85".

Column 3, line 48, Claim 1, "toward" should be --towards--.

Column 4, line 15, Claim 5, delete "one of".

Column 4, line 26, Claim 9, delete "one of".

Signed and Sealed this

Twenty-first Day of June, 1994

*Attest:*

Bruce Lehman

BRUCE LEHMAN

*Attesting Officer*

*Commissioner of Patents and Trademarks*